April 10, 1951 W. L. PHILLIPS ET AL 2,547,970
CONTROLLING HEATING VALVE OF NATURAL GAS
Filed Feb. 28, 1948
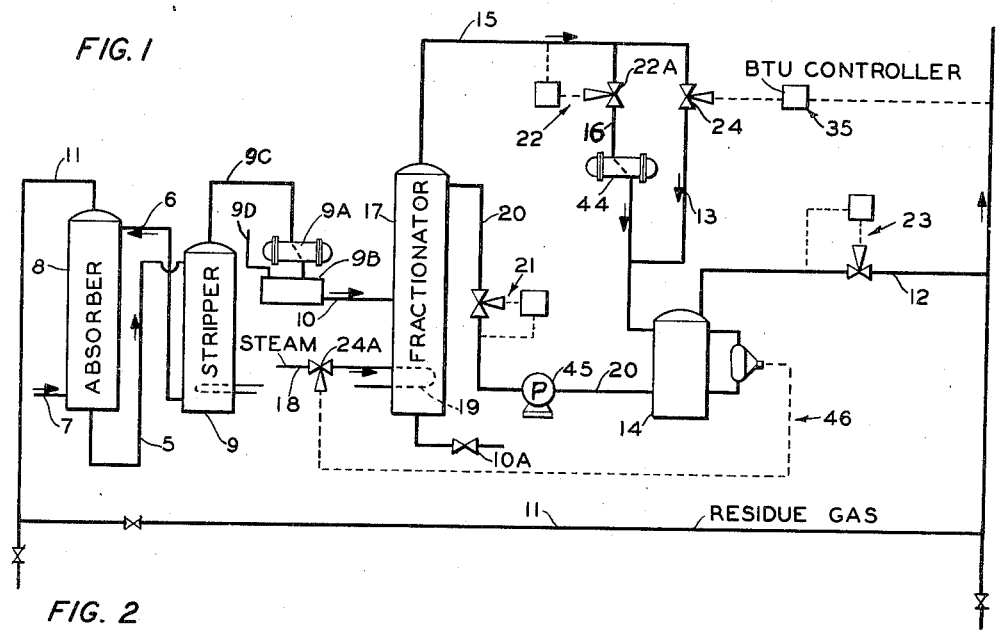
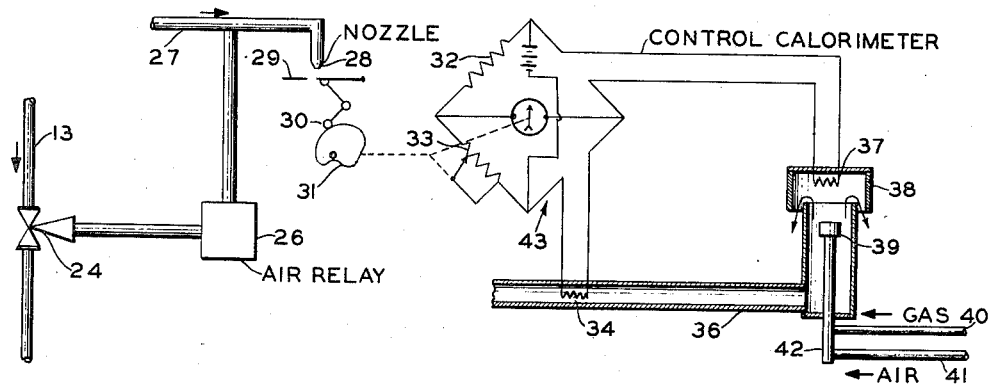
INVENTORS
C. P. STANLEY
W. L. PHILLIPS
BY Hudson & Young
ATTORNEYS Patented Apr. 10, 1951

2,547,970

UNITED STATES PATENT OFFICE 2,547,970

CONTROLLING HEATING VALVE OF NATURAL GAS

William Lonnie Phillips, Odessa, Tex., and Clyde P. Stanley, Tulsa, Okla., assignors to Phillips Petroleum Company, a corporation of Delaware Application February 28, 1948, Serial No. 12,094

5 Claims. (Cl. 196—8)

This invention relates to a fractionator control system. In one of its more specific aspects it relates to a method and apparatus for controlling a deethanizing fractionator. In a still more specific aspect the invention relates to a method and apparatus for controlling a deethanizing fractionator in which the kettle product is deethanized and a minimum quantity of propane is taken overhead, this quantity of propane being just a sufficient amount that when injected into a stream of residue gas a predetermined calorific value of the residuous gas will automatically be maintained.

If a fractionating column is operated in accordance with well known fractionation practices such as maintaining constant steam input, or controlling the rate of steam input in response to the temperature at some point in the column, the overhead vapors will be of substantially constant composition so long as feed composition does not vary. Normally all of the overhead vapors pass through the condenser and excess condensate together with uncondensed vapor are withdrawn as overhead product. Such operation will assure deethanization of the kettle product but not the retention of maximum propane in the kettle product. Our invention provides a method of operation which assures a reflux of optimum composition with respect to propane when operating to deethanize a natural gasoline and to retain all the propane possible in the kettle product. The invention affords a method of operation for a combined natural gasoline extraction and stabilization plant whereby the maximum quantity of desired hydrocarbons are retained in the stabilized gasoline and the residue gas is maintained at a predetermined B. t. u. value.

It should be understood that extraction may be accomplished by absorption, by refrigeration-adsorption, or various known combinations of these processes.

An object of our invention is to provide a method and apparatus for automatically controlling the operation of a deethanizing fractionator. Another object of our invention is to provide a method and apparatus for controlling the B. t. u. content of a residue gas stream at a predetermined value. Other objects and advantages of our invention will be apparent to those skilled in the art upon reading the following description of the embodiment of our apparatus and method found at the present time as the most practical.

In the drawing, Figure 1 is a schematic flow diagram of a gasoline extraction-gas enrichment system embodying our invention. Figure 2 is a schematic illustration of the controlling calorimeter forming a part of the system of Figure 1.

Referring to Figure 1, a natural gas through a line 7 enters an absorber 8 and treated gas leaves this absorber through an overhead line 11. Lean absorption oil enters the absorber 8 through a line 6 and after contacting the natural gas leaves the absorber through a rich oil line 5. Line 5 leads the rich oil to a stripper column 9 in which a conventional stripping operation takes place. This stripping operation amounts to adding heat to the contents in the lower portion of the column to vaporize the hydrocarbons which were absorbed by the absorption oil in the absorber 8. These vaporized hydrocarbons leave the stripper through an overhead line 9C and pass through a condenser 9A into an accumulator tank 9B. Uncondensed gases leave the accumulator 9B through a line 9D and pass to a vapor recovery plant or to such other disposal, as desired, not shown. The raw natural gasoline passes from the accumulator tank 9B through the line 10 and is introduced into about the mid section of a fractionator column 17. It should be understood the several well known steps such as the heat exchange of the rich oil with lean oil, one or more flash tanks for removing light hydrocarbons from rich oil, preheating of rich oil before entering still, use of superheated steam for stripping, dephlegmation of the still overhead vapors to condense the steam and remove any traces of oil, various vapor recovery or recompression steps, together with various pumps and controls, have been omitted for purposes of simplicity, and are not shown in the drawings as their use is not critical, and while generally preferred they need not be employed in the practice of the invention except that sufficient pumps are provided to maintain the circulation of fluids as shown in the drawings.

The absorption oil freed from its absorbed constituents leaves the bottom of the stripper and may be conducted through a cooler, not shown, and on through line 6 and is introduced into the top of the absorber column for acquiring another charge of hydrocarbons from the natural gas. The column 17 as herein disclosed may be termed a stabilizer, deethanizer or deethanizing fractionator, all such terms as used herein are intended to be synonymous. The column may be termed a deethanizer or deethanizing fractionator since it is intended to serve as a means for removing ethane and lighter from the natural gasoline feed stock introduced into the column through the charge line 10. The column 17 is equipped with a reboiler coil 19 and overhead line 15 for removing overhead vapors from the column, a reflux line 20 for introduction of liquid reflux and a bottoms draw-off line 10A. A line 18 conducts steam from a source, not shown, to the reboiler coil 19. The flow of this steam is controlled by a motor valve 24A.

The overhead vapor line 15 is manifolded into two vapor lines, 13 and 16. Line 13, termed herein a by-pass line, is equipped with a motor valve 24. The line 16 is equipped with a motor valve 22A which is a part of a back pressure controller assembly 22. The line 16 also carries a condenser 44 which is intended to cool and condense at least a portion of material passing through the line 16 prior to its entry into an accumulator vessel 14. The by-pass line 13 joins the line 16 on the downstream side of the condenser 44. The accumulator 14 has a bottoms outlet to which a line 20 is connected for passage of liquid reflux under the action of a pump 45 to the top portion of the deethanizer 17. This rate of flow of reflux through line 20 is controlled by a rate of flow controller assembly 21.

The accumulator 14 is equipped with a liquid level controller assembly 46 which assembly is operatively connected with the motor valve 24A in the steam line 18. The accumulator is further attached to an overhead gas removal line 12 which is intended to conduct gases from the top of the accumulator and deliver them into the residue gas line 11. This gas line 12 is equipped with a back pressure controller assembly 23.

The absorber-stripper units of the assembly of Figure 1 are intended to operate in a normal and conventional manner. The absorption oil flowing down through the absorber is intended to extract all or substantially all of the condensible hydrocarbons contained in the natural gas feed entering through the line 7 and is further intended to absorb as nearly all as possible of the normally gaseous hydrocarbons such as butane and propane. In absorbing gasoline hydrocarbons from natural gas some ethane and a little methane are always absorbed. The enriched absorption oil leaves the absorber and is conducted by line 5 into the stripper vessel 9 in which the absorbed hydrocarbons are removed by a normal stripping operation. The stripped gases pass through the overhead vapor line and in condenser 9A as many of these vapors are condensed as possible. The condensate passes on through line 10 into the deethanizer vessel 17. This vessel 17 is operated under such conditions of temperature and pressure, that the bottoms product ultimately withdraw through line 10A is free from ethane but contains nearly all of the propane. The overhead vaporous material from this column leaves through the overhead line 15 and a portion thereof passes through line 16 and the remainder through the by-pass line 13. The back pressure controller 22 responsive to pressure in the overhead line 15 maintains a nearly constant pressure on column 17 and controls the flow of these overhead vapors into line 16 and condenser 44 by the throttling action of motor valve 22A in response to the pressure of the vapors in line 15. The hydrocarbons comprising the vapor stream are condensed, or partially condensed by condenser 44 in accordance with their respective vapor pressures. Since propane has the lowest vapor pressure, the condensate is rich in propane.

A controlled portion of the overhead vapors in line 15 by-pass the motor valve 22A and the condenser 44 and pass through line 13 containing the motor valve 24. The vapors passing through this line 13 obviously are not condensed and these vapors substantially as such are thus conducted into the accumulator vessel 14. However, it will be noted that we have shown line 13 as being connected to line 16 on the downstream side of the condenser 44 and some of the propane from the vapors from line 13 will be condensed by the cool condensate originating in the condenser 44. This, with a little ethane from line 13, will be condensed or dissolved by the time the material from line 13 enters the accumulator 14. However, not all of the propane is retained by this cool condensate and the propane and lighter remaining uncondensed will accumulate in the upper portion of the accumulator 14 as gas. The back pressure controller assembly 23 is intended to operate in such a manner as to permit flow of gases from the upper portion of accumulator 14 through line 12 into the residue gas line 11 in response to accumulator pressure. The motor valve of this back pressure controller assembly 23 is a throttling type motor valve and it is intended to be open to some extent as long as pressure on the accumulator is sufficiently high. The pressure is usually sufficiently high to maintain the valve open to some extent as the methane and ethane from the deethanizer column must pass through line 12. This pressure controller 23 is intended to maintain a constant pressure on the accumulator 14 irrespective of the amount of gas to be passed from the accumulator to the residue gas line 11. This controller 23 actually controls the pressure on the deethanizer 17.

The volume of propane rich condensate from the accumulator 14 which passes through the reflux 20 under the influence of the pump 45 is controlled by the rate of flow controller 21. This controller 21 is set to maintain a predetermined rate of flow of reflux into the deethanizer 17. If the condensate in the accumulator 14 increases in volume faster than is necessary for refluxing purposes, the liquid level controller assembly 46 operates to throttle the motor valve 24A in the steam line 18 and in this manner steam to the reboiler coil 19 is decreased and accordingly less propane will be driven overhead from the deethanizer 17 and the level of the propane rich condensate in the accumulator 14 will drop. And in like manner, when the level of the condensate in the accumulator 14 reaches a predetermined low value the float controller assembly 46 operates to open somewhat the motor valve 24A and permit the passage of more steam into the reboiler coil 19 and this operation causes more propane to pass from the deethanizer into the accumulator 14. The condenser 44 is intended to condense as much of the propane as possible and in so doing all of this condensed propane ultimately finds its way back into the deethanizer 17, and is finally withdrawn in the bottoms product through the line 10A. Any propane which is not condensed in the condenser 44 and enters the accumulator 14 will ultimately find its way through the pipe 12 into the residue gas line 11. In order to control the amount of propane added to the residue gas it is necessary to permit the entrance of some uncondensed propane into the accumulator, and such is the function of line 13 with its throttling motor valve 24. Condenser water temperature in plants is usually constant, hence that factor cannot easily be used to vary condensation. The B. t. u. controller assembly 35 is so constructed and operated that when the B. t. u. value of the residue gas in line 11 drops below a predetermined value this controller operates to open somewhat the motor valve 24 and permit the entrance of uncondensed fractionator overhead vapors from the line 15 through line 13 into the accumulator 14. Such vapors soon flow through the back pressure regulator assembly 23 into the residue gas line 11. When a sufficient quantity of vapors containing a variable amount of propane as regulated by the operation of the process of this invention is added to the residue gas in this manner the B. t. u. controller assembly operates to throttle the valve 24 and to close partly or entirely the motor valve 24 to the flow of propane containing gas. In this manner, we have found that a residue gas may be continuously and uniformly enriched with sufficient gaseous propane to maintain any desired B. t. u. content.

The B. t. u. controller assembly 35 is illustrated in schematic form in Figure 2 and its operation and construction is hereinafter explained. A precisely measured stream of gas is supplied through a line 40 from the residue gas line 11 (of Figure 1) to a manifold line 42. A precisely measured stream of air also enters this manifold line 42 through the line 41, from a source, not shown. The air entering through the line 41 may be termed the primary combustion air. The air and gas entering from lines 41 and 40, respective, mix in the manifold line 42 and the mixture is delivered to and burned in a burner 39 which is constructed to enclose the flame entirely. A definitely measured stream of secondary or absorbing air is admitted through a line 36, the end of which forms a cylindrical housing about the flame chamber and which in turn is enclosed by means of a casing 38 concentric therewith and at a spaced distance therefrom. This structure is arranged so that the heat generated in the burner 39 is transferred to the absorbing air. The air supply line 36 has mounted therein a thermometric resistance 34 responsive to the temperature of the absorbing air. Likewise, a thermometric resistance 37 is arranged at a point within the housing 38 where it will be responsive to measure the temperature of the absorbing air after it has been heated by the burner 39. The electrical resistances 34 and 37 are mounted in adjacent arms of a Wheatstone bridge assembly 43. In one of the arms of the other pair is a fixed resistance 32 and in the remaining arm is a variable resistance 33. There are many types of variable resistances available for this purpose, of which the well known slide wire potentiometer is suitable. The balancing motion of the potentiometer or recording potentiometer, if it be of the recording type, is connected in any suitable manner to effect the rotation of a cam 31. A cam follower 30 is connected in any manner with a pivotly mounted flapper or baffle 29 positioned adjacent the discharge end of an air nozzle 28 to which air or other gas is delivered from a suitable source through a line 27. Also connected to the line 27 is a fluid operated relay valve 26 which controls the output pressure or controlled air from the instrument to the diaphragm of control valve 24 in response to the movement of baffle 29 with respect to nozzle 28.

As the B. t. u. value of the gas flowing through the residue gas line 11 varies, the balance of the Wheatstone bridge 43 will be disturbed by reason of the changing temperature difference between the entrance temperature of the absorbing air and its temperature after it has absorbed the heat of combustion. Thus the amount of current flowing through the arm of the bridge containing the potentiometer will vary, and as a result the recording controller will be actuated to reestablish balance through which operation it follows that cam 31 will rotate. This movement of the cam will result in varying the position of thhe baffle member 29 with regard to the orifice of the nozzle 28. As the baffle member 29 moves closer to the discharge orifice, the pressure in the line 27 will build up, operating the pressure fluid operated relay to cause diaphragm valve 24 to move toward the closed position, thereby throttling or entirely closing off line 13 to the flow of overhead gases from the deethanizer 17. As is well understood in the art, the apparatus can be adjusted to maintain a substantially constant B. t. u. value of the gas in line 11 and to open or close the motor valve 24 in the proper direction to compensate for deviations above or below the desired B. t. u. value.

Those skilled in the art will immediately appreciate that the system herein disclosed is capable of variation in its details without departure from the subject matter of the combination herein described. As an example, the pressure fluid operated valve 24 might be replaced by an electric motor actuated valve and the air relay 26 might be modified to effect an electrical control of the valve without departing from our novel combination.

Auxiliary apparatus such as valves, pumps, and detailed construction of the pressure regulators are not shown for purposes of simplicity since the construction and operation of such apparatus are well known.

The pressures and temperatures of the absorbing column 8, of the stripper column 9 and of the deethanizer column 17 may be so selected as to obtain the desired results and these may be varied within rather wide limits as will be realized by those skilled in the art.

While residue gas originating from a natural gasoline extraction plant was described as being enriched for B. t. u. maintenance, it is to be understood that a residue gas from any source may be enriched with high B. t. u. gaseous constituents from a fractionating column controlled in accordance with our invention. In like manner, the gas to be enriched need not necessarily be a residue gas nor even a hydrocarbon gas but may be a manufactured gas such as water gas, coal gas, producer gas, or any other type of gas.

Having disclosed our invention, we claim:

1. In a gasoline extraction system wherein a natural gas containing hydrocarbons boiling within the gasoline boiling range and hydrocarbons boiling lower than the gasoline boiling range are extracted as natural gasoline from the natural gas leaving a residue gas, a method for maintaining the B. t. u. content of the residue gas at a predetermined value comprising deethanizing the natural gasoline to produce an ethane free natural gasoline and an overhead product containing ethane and some propane, separating this overhead product into a first portion and a second portion, cooling said first portion to produce some condensate and returning this condensate to the stabilizer as reflux, and adding the second portion of the overhead product and uncondensed vapors from said first portion to the residue gas; continuously determining the B. t. u. content of the thus enriched residue gas and controlling said separation of the stabilizer overhead product to provide a sufficient quantity of said second portion of the overhead product to maintain the B. t. u. content of the enriched residue gas at said predetermined value.

2. In the method of claim 1, wherein the deethanizer overhead vapors contain propane and lower boiling hydrocarbons, and ethane remains uncondensed in said first portion of the overhead vapor product.

3. In the method of claim 1, wherein deethanizer bottoms free from ethane are removed from the system as one product.

4. A method for producing a residue gas of predetermined B. t. u. content and a deethanized natural gasoline from a natural gas containing hydrocarbons boiling within the gasoline boiling range and hydrocarbons boiling lower than the gasoline boiling range comprising, in combination, the steps of producing from the natural gas an unstable raw natural gasoline containing some ethane and dissolved methane and a residue gas containing methane and some ethane, stabilizing the raw natural gasoline to produce a stabilizer bottoms of gasoline free from ethane and dissolved methane as one product of the process, and an overhead vaporous product containing said ethane and methane and some propane, separating this overhead product into a first portion and a second portion, cooling said first portion to produce some condensate and returning this condensate to the stabilizer as reflux, and adding the second portion of the overhead product and uncondensed vapors from said first portion to the residue gas; continuously determining the B. t. u. content of the thus enriched residue gas and controlling said separation of the stabilizer overhead product to provide a sufficient quantity of said second portion of the overhead product to maintain the B. t. u. content of the enriched residue gas at said predetermined value, and controlling the addition of reboiling heat to the stabilizing step in response to the volume of said condensate and removing the enriched residue gas as a second product of the process.

5. In a system of the type described, the combination comprising a conduit for passage of a residue gas, means for stabilizing a natural gasoline into a liquid bottoms and an overhead normally vaporous product, a pair of conduits for passage of parallel portions of said normally vaporous product, a motor operated valve in one of said pair of conduits for controlling the flow of said parallel portions of said vaporous product in said pair of conduits, a condenser in the other of said pair of conduits, means for mixing said parallel portions, means for separating liquid from uncondensed gas of said mixed parallel portions, means for adding said separated gas to said residue gas in said conduit, a calorimeter for measuring the B. t. u. content of the enriched residue gas in said conduit and means responsive to the B. t. u. content of said enriched residue gas for actuating said motor value.

WILLIAM LONNIE PHILLIPS.
CLYDE P. STANLEY.

REFERENCES CITED

The following references are of record in the file of this patent:

UNITED STATES PATENTS

| Number | Name | Date |
|---|---|---|
| 1,704,101 | Pinkerton | Mar. 5, 1929 |
| 1,769,373 | Kruse | July 1, 1930 |
| 1,851,743 | Wadsworth | Mar. 29, 1932 |
| 2,965,088 | Wade | July 3, 1934 |
| 2,072,384 | Schmidt | Mar. 2, 1937 |
| 2,104,310 | Roelfsema | Jan. 4, 1938 |
| 2,168,683 | Raigorodsky | Aug. 8, 1939 |